United States Patent [19]

Hill

[11] Patent Number: 4,800,239

[45] Date of Patent: Jan. 24, 1989

[54] DECORATIVE SWITCH PLATE AND RECEPTACLE WALL PLATE

[75] Inventor: D. James Hill, Medford, N.J.

[73] Assignee: Vanguard-Hill, Inc., Wilmington, Del.

[21] Appl. No.: 45,461

[22] Filed: May 4, 1987

[51] Int. Cl.$^4$ .............................................. H02G 3/14
[52] U.S. Cl. ...................................... 174/66; 220/241
[58] Field of Search ................... 174/66, 67; 220/241, 220/242; 439/536

[56] References Cited

U.S. PATENT DOCUMENTS

| | | | |
|---|---|---|---|
| 2,289,198 | 7/1942 | Jordan | 220/241 |
| 2,515,820 | 7/1950 | Clark | 174/66 X |
| 2,980,283 | 4/1961 | Bentsen | 220/24.2 |
| 4,009,797 | 3/1977 | Lee | 220/242 |

Primary Examiner—A. T. Grimley
Assistant Examiner—David A. Tone
Attorney, Agent, or Firm—Robert D. Thompson

[57] ABSTRACT

An easily decorative/redecorative switch and receptacle wallplate comprising a baseplate with retaining lip to be attached to the switch/receptacle by screws, a decor plate, decor, transparent shield and outer frame all of which are attached to the baseplate with a trim frame around the perimeter of the entire assembly with a lip on either side enclosing the baseplate lip and the edges of the decor plate, decor, transparent shield and over frame. The trim frame is easily removable for the changing of the decor.

7 Claims, 3 Drawing Sheets

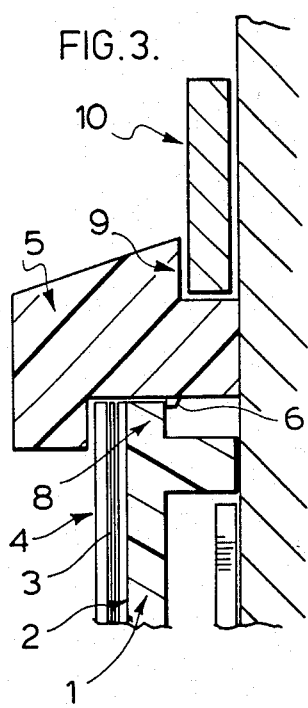
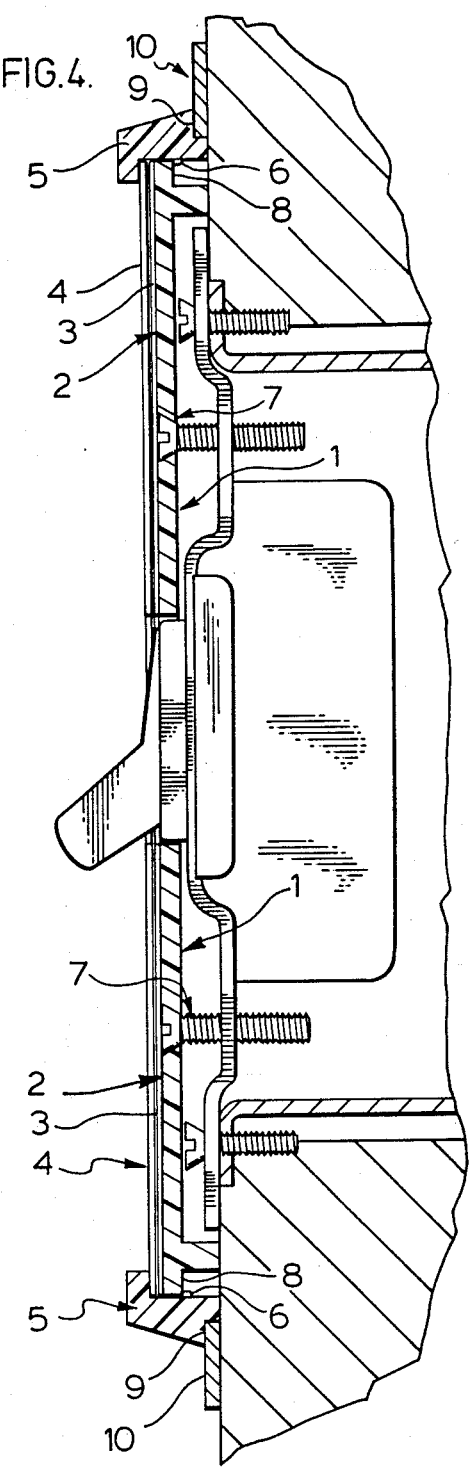

DECORATIVE SWITCH PLATE AND RECEPTACLE WALL PLATE

BACKGROUND OF INVENTION

This invention relates to decorative/redecorative electrical switch and receptacle plates. There are in the marketplace today a variety of plate designs for switches and receptacles all of which have the attachment screws for the plate to the receptacle visible. This makes the increasingly desirable practice of putting wallpaper, wall fabric or other decorative means on the plates in a professional manner extremely difficult. Further, once those plates are decorated, it becomes difficult to remove the switch or receptacle plate. If wallpaper or other covering has been placed upon the plate, the screwdriver penetrating that decorative cover to remove the attaching screw(s) effectively destroys the intended clean and unbroken surface of the plate.

In addition, the design of the presently existing plates makes the professional attachment of a decorative cover difficult and leaves that decorative cover exposed to dirt and finger smudges which accummulate from repeated use of the switch and/or receptacle.

The principal object of this invention is to provide a decorator plate over the screwed-on baseplate, said decorator plate of a material that will accept paint, wallpaper, wall fabric or other decorative finish to blend or contrast with the surrounding wall surface. Another object of this invention is to provide a transparent, washable shield over the finish chosen on the decorator plate. The decorator plate and the transparent washable shield are attached to the baseplate by means of a snap-on trim frame which also conceals any irregular or ragged perimeter of the wallpaper, fabric or other decorative material attached to the decorator plate. The device provides an attractive cover for wall switches and receptacle plates without visible, unsightly mechanical attachment devices. A surrounding overframe may also be added. This style-modifying overframe around the snap-on trim frame allows the owner to blend the plate configuration with the other room decor. The stylizer over-frame is easily changed if the room for any reason goes through a style or decor change. Another application of this invention is to permit the easy customizing of plates as, for example, with the logo of large corporations seeking an architectural identity throughout their offices and other facilities.

SUMMARY OF THE INVENTION

The present invention provides a switch plate which is attractive without any visible means of attachment to the electrical switch or receptacle. The switch/receptacle wall plate assembly includes a baseplate which is attached to the electric switch or receptacle. This baseplate features a continuous recess around its perimeter forming a lip or flange. A detachable trim frame is placed around the baseplate enclosing the baseplate flange to hold in place over the baseplate a second opaque plate covering all of the baseplate except the control switch and/or receptacle. A transparent plate covers the entire opaque plate and is also held in place by the trim frame. An additional design modifying decoration can be achieved through the use of an outer frame which is held in place by the outer retaining edge of the trim frame. The resulting apparatus presents an attractive appearance without exposing connecting screws. The color of the opaque plate or the material covering it may be easily changed by merely removing the trim frame and replacing the decor plate or recovering it with a different material. A decorative outer frame may be added around the outer retaining edge of the trim frame to enhance the general appearance of the apparatus.

DESCRIPTION OF SEVERAL VIEWS OF THE DRAWINGS

A more complete understanding of the invention and its advantages will be apparent from the detailed description taken in conjunction with the accompanying drawings in which:

FIG. 3 is a side elevation detail enlarged in scale showing the interface of the trim frame and the baseplate holding the decor plate, decor material and transparent shield in place and showing the interface of the trim frame and optional overframe.

FIG. 4 is a sectional view of the invention taken along line 4-4 showing the continuous lip or flange around the perimeter of the baseplate, the projections or retainer buttons on the trim frame and the recess around the perimeter of trim frame forming a flange which holds the optional overframe in place.

DETAILED DESCRIPTION

Figure 1:
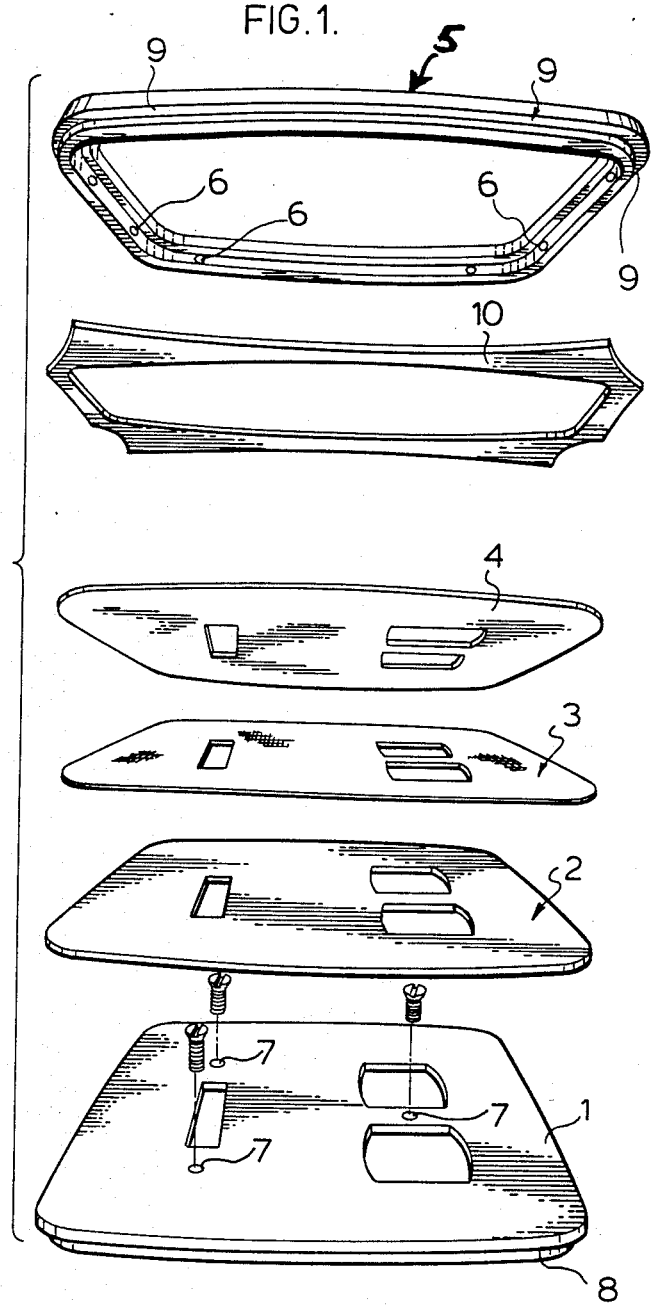
FIG. 1 is an exploded view of the invention showing the baseplate, decor plate, decor material, transparent shield, trim frame and overframe.
Figure 2:
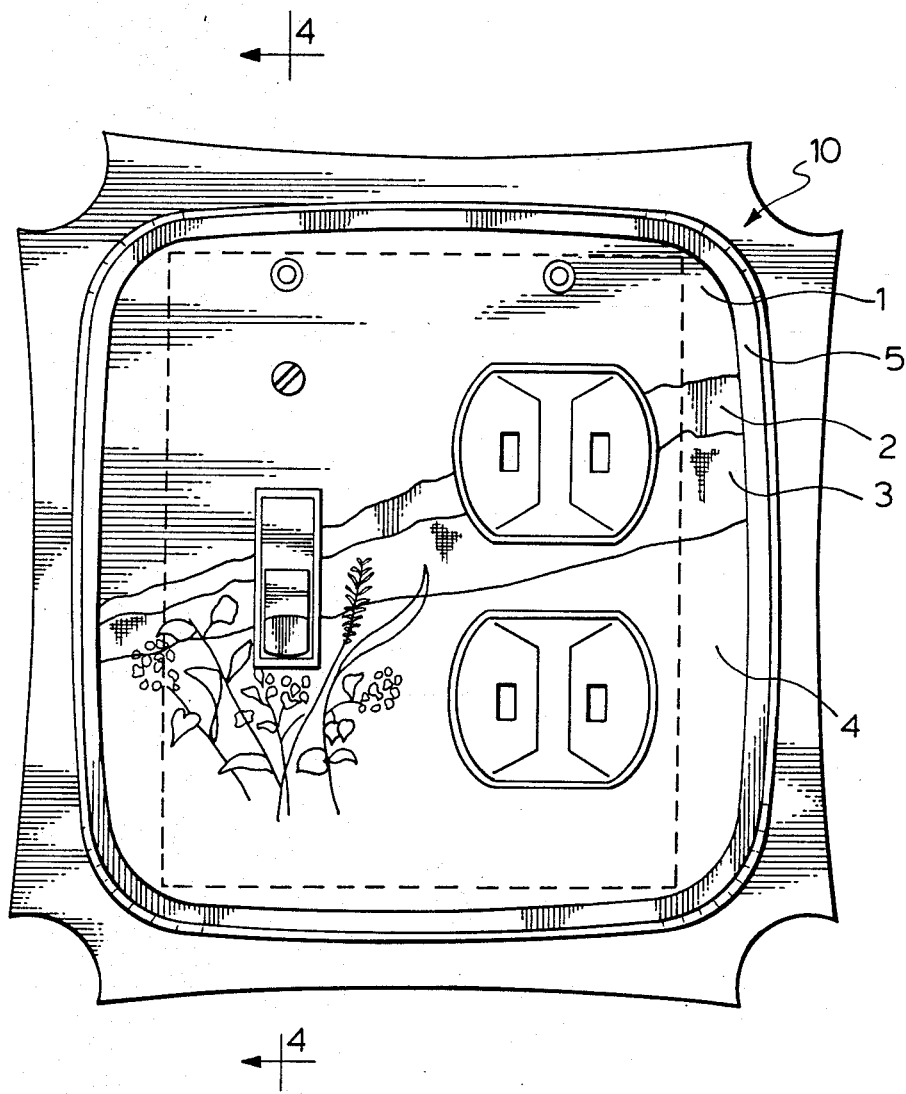
FIG. 2 is a front perspective view of the invention in place on a switch with the decor plate, decor material, and transparent shield partially broken away and showing the baseplate attached to the switch assembly with a countersunk screw.

Referring in detail to the drawings and in particular to FIG. 1, the assembly includes a baseplate 1, a decor plate 2, decor material 3, a transparent shield 4, an overframe 10, and a trim frame 5. The trim frame 5, is shaped such that the opening it forms at its rear is the same shape but slightly larger than the baseplate 1 such that the rear opening will fit over and around the baseplate 1, while the opening the trim frame 5 forms at its front face is of the same shape as the baseplate 1 but smaller such that the front face of the trim frame 5, frames the front surface of the baseplate 1. The inner edges of the rear opening of the trim frame 5 have small projections or retainer buttons 6 which hold the edges of the baseplate 1 against the front opening of the trim frame 5 as shown in FIG. 3. The projections or retainer buttons 6 on the inner edges of the rear opening of the trim frame 5 are placed in a pair or pairs on opposite sides of the inner edges of the rear trim frame opening such that the distance between opposite retainer buttons on the inner side edges of the trim frame is less than the width of the baseplate and the distance across the trim frame opening between retainer buttons at the bottom edge and top edge of the rear trim frame opening is less than the length of the baseplate 1. The baseplate 1 is attached to the switch/receptacle using flathead screws through countersunk holes 7 in the baseplate. The decor plate 2, decor material 3, transparent shield 4 and over-frame 10 (if used) are placed on the baseplate and held in place by the trim frame 5 which fits over the continuous lip or flange 8 on the baseplate 1 and holds the decor plate 2, decor material 3, transparent shield 4 and overframe 10 in place over their perimeter edges. The trim frame 5 is held in place over the baseplate 1 by retainer buttons 6 snapping under the baseplate flange 8, firmly fixing in place the decor plate 2, decor material 3, and transparent shield 4. The trim frame flange 9 retains the overframe 10 of desired design around the trim frame 5 and plate assembly.

The trim frame 5 can be detached by gripping the frame 5 on two sides near any corner and pulling the frame 5 until the retainer buttons 6 snap over the baseplate flange 8, after which the trim frame 5 is pressed toward the opposite corner of the baseplate 1 separating the trim frame 5 from the baseplate 1. The decor plate 2, decor material 3 and decor shield 4 are released from the assembly by the frame 5 snapping off the baseplate 1 allowing the change of the decor to suit the owner.

What is claimed is:

1. A wallpaper assembly for mounting on electrical switch assemblies and receptacle assemblies comprising a baseplate with means for attachment to an electric switch assembly or receptacle assembly, said baseplate having a continuous recess around its rear surface perimeter forming a lip or flange at its front surface perimeter with openings for electrical switch lever or levers and/or outlet or outlets, decorated decor plate and transparent shield of the same size and shape as the baseplate but with no visible means for direct attachment to the electrical switch or receptacle, and a decorative trim frame with means operative to enclose and surround the baseplate flange and perimeter edges of the decorative and protective plates.

2. The apparatus of claim 1 comprising a trim frame having a continuous recess around its outer rear surface perimter forming a lip or flange at its outer front surface perimeter and additionally comprising a decorative overframe with a opening of the same shape as the rear perimeter of the trim frame formed by the continuous recess but of a size which is larger than the trim frame near perimeter but smaller than the trim frame front perimeter formed by the trim frame flange.

3. The apparatus of claim 1 comprising a trim frane having a continuous recess around its outer rear surface perimeter forming a lip or flange at its outer front surface perimeter and additionally comprising a decorative overframe wherein the trim frame flange is disposed about the inner front surface of the decorative overframe.

4. A wallplate assembly for mounting on electrical switch assemblies and receptacle assemblies comprising a baseplate with means for attachment to an electric switch assembly or receptacle assembly, said baseplate having a continuous recess around its rear surface perimeter forming a beveled edged lip or flange at its front surface perimeter with openings for electrical switch lever or levers and/or outlet or outlets, decorated decor plate, and transparent shield of the same shape and size as the baseplate but with no visible means for direct attachment to the electrical switch or receptacle, and a decorative trim frame having a rear or wallside opening of the same shape as but larger size than the baseplate with pairs of projections or retainer buttons located at multiple points on the inner edges of the rear opening of the trim frame such that the distance between the ends of the projections or retainer buttons on the sides and ends of the trim frame across the rear side of the trim frame is less than the width and length respectively of the baseplate, and a front side opening of the same shape but smaller size than the baseplate, said front side trim frame opening and rear side trim frame projections or retainer buttons enclosing the baseplate flange and the perimeter surface of the decor and shield plates to hold the decor and shield plates in position on the baseplate.

5. An apparatus according to claim 4 comprising a trim frame having a continuous recess around its outer rear surface perimeter forming a lip or flange at its outer front surface perimeter and additionally comprising a decorative overframe with an opening of the same shape as the rear perimeter of the trim frame formed by the continuous recess but of a size larger than the trim frame rear perimeter but smaller than the perimeter formed by the trim frame flange.

6. An apparatus according to claim 4 comprising a trim frame having a continuous recess around its outer rear surface perimeter forming a lip or flange at its outer front surface perimeter and additionally comprising a decorative overframe wherein the trim frame flange is disposed about the inner front surface of the decorative overframe.

7. A wall switch cover plate assembly or electrical receptacle cover plate assembly comprising a baseplate having a continuous recess around its rear surface perimeter forming a beveled edged lip or flange at its front surface perimeter, with openings for electrical switch lever or levers and/or outlet or outlets, and connecting screws, a decorated decor plate and a transparent shield, of the same shape and size as the baseplate but without connecting screw openings, and a trim frame having a modified U-shape cross-section forming a continuous flexible channel such that the opening formed by the sides of the channel is of the same shape but of a smaller size than the baseplate thereby enclosing the flange of the baseplate and the perimeter of the decor and shield plates and holding them in position on the baseplate.

* * * * *